United States Patent
Berkhoel et al.

[11] Patent Number: 5,954,849
[45] Date of Patent: *Sep. 21, 1999

[54] FILTER ELEMENT

[75] Inventors: James Leonard Berkhoel, Woodbury, Minn.; Michael S. Bergeson; Dolan D. Bartels, both of Cresco, Iowa

[73] Assignee: Donaldson Company, Inc., Minneapolis, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/941,615

[22] Filed: Sep. 30, 1997

Related U.S. Application Data

[63] Continuation of application No. 08/551,898, Oct. 23, 1995, Pat. No. 5,803,941, which is a continuation-in-part of application No. 08/371,809, Jan. 12, 1995, abandoned.

[51] Int. Cl.$^6$ .......................... B01D 27/00; B01D 46/02
[52] U.S. Cl. ................... 55/498; 55/502; 55/510
[58] Field of Search .............. 55/498, 502, 510, 55/492

[56] References Cited

U.S. PATENT DOCUMENTS

| | | |
|---|---|---|
| 2,962,121 | 11/1960 | Wilber . |
| 2,988,170 | 6/1961 | Pritchard . |
| 3,078,650 | 2/1963 | Anderson et al. . |
| 3,147,100 | 9/1964 | Wilber . |
| 3,169,844 | 2/1965 | Young . |
| 3,395,208 | 7/1968 | Witchell ............................. 55/502 |
| 3,423,909 | 1/1969 | Bennett et al. . |
| 3,672,130 | 6/1972 | Sullivan et al. . |
| 3,906,724 | 9/1975 | Yoshizaki . |
| 4,020,783 | 5/1977 | Anderson et al. . |
| 4,113,627 | 9/1978 | Leason . |
| 4,128,251 | 12/1978 | Gaither et al. . |
| 4,135,899 | 1/1979 | Gauer . |
| 4,159,197 | 6/1979 | Schuler et al. . |
| 4,171,963 | 10/1979 | Schuler ............................... 55/498 |
| 4,211,543 | 7/1980 | Tokar et al. . |
| 4,227,898 | 10/1980 | Kamekawa et al. . |

(List continued on next page.)

FOREIGN PATENT DOCUMENTS

| | | |
|---|---|---|
| 658529 | 2/1963 | Canada .................................. 55/502 |
| 0 470 328 A1 | 3/1991 | European Pat. Off. . |
| 0 470 330 A1 | 4/1991 | European Pat. Off. . |
| 0 483 629 A1 | 5/1992 | European Pat. Off. ........... 55/502 |
| 2 261 041 | 9/1975 | France . |
| 2 268 551 | 11/1975 | France . |
| 53-2763 | 1/1978 | Japan ................................... 55/502 |
| 59-141150 | 9/1981 | Japan . |
| 1535788 | 12/1978 | United Kingdom ............... 55/502 |
| WO 91/13675 | 9/1991 | WIPO . |
| WO 94/13389 | 6/1994 | WIPO .................................. 55/502 |

OTHER PUBLICATIONS

Owner's Manual, Sears Craftsman Engine Model No. 143.354212, pp. 1,3,7 and 8, Feb. 1, 1988.
Tecumseh Products Co., Engine Divisions, Filter–Air–Cleaner, Drawing No. 100–96, Sh. 1., Feb. 23, 1989.
Tecumseh Products Co., Engine Divisions, Collar–Air Cleaner, Drawing No. 71–0–3, Feb. 23, 1989.
Declaration with Exhibit A.

*Primary Examiner*—C. Scott Bushey
*Attorney, Agent, or Firm*—Merchant & Gould P.C.

[57] ABSTRACT

A filter element includes first and second ends, an extension of filter media, an outer liner, an inner liner, and a sealing ring. The first end cap consists essentially of a foamed polyurethane having an as molded density of about 14–22 pounds per cubic foot. The sealing ring extends outwardly only from the outer surface of the first end cap. The sealing ring is a molded part of the first end cap and consists essentially of foamed polyurethane having an as molded density of about 14–22 pounds per cubic foot. The sealing ring has an axially directed top edge, first and second sidewall portions, and a base. The first and second sidewall portions are immediately adjacent to and angled from the top edge of the sealing ring.

13 Claims, 11 Drawing Sheets

U.S. PATENT DOCUMENTS

| | | |
|---|---|---|
| 4,235,611 | 11/1980 | Brownell . |
| 4,312,651 | 1/1982 | Esaki et al. . |
| 4,314,832 | 2/1982 | Fox . |
| 4,322,230 | 3/1982 | Schoen et al. . |
| 4,349,363 | 9/1982 | Patel et al. . |
| 4,350,509 | 9/1982 | Alseth et al. . |
| 4,369,113 | 1/1983 | Stifelman . |
| 4,443,237 | 4/1984 | Ulvestad . |
| 4,488,889 | 12/1984 | McCarroll . |
| 4,491,460 | 1/1985 | Tokar . |
| 4,507,203 | 3/1985 | Johnston . |
| 4,609,465 | 9/1986 | Miller . |
| 4,634,527 | 1/1987 | Marshall . |
| 4,720,292 | 1/1988 | Engel et al. . |
| 4,759,783 | 7/1988 | Machado . |
| 4,838,901 | 6/1989 | Schmidt et al. . |
| 4,950,317 | 8/1990 | Dottermans . |
| 5,030,264 | 7/1991 | Klotz et al. . |
| 5,043,114 | 8/1991 | Saito et al. . |
| 5,082,476 | 1/1992 | Kahlbaugh et al. . |
| 5,112,372 | 5/1992 | Boeckermann et al. . |
| 5,120,337 | 6/1992 | Benzler et al. . |
| 5,167,683 | 12/1992 | Behrendt et al. . |
| 5,222,488 | 6/1993 | Forsgren . |
| 5,250,179 | 10/1993 | Spearman . |
| 5,290,330 | 3/1994 | Tepper et al. .............................. 55/502 |
| 5,484,466 | 1/1996 | Brown et al. . |
| 5,547,480 | 8/1996 | Coulonvaux .............................. 55/502 |
| 5,556,440 | 9/1996 | Mullins et al. . |
| 5,803,941 | 9/1998 | Berkhoel et al. ........................ 55/498 |

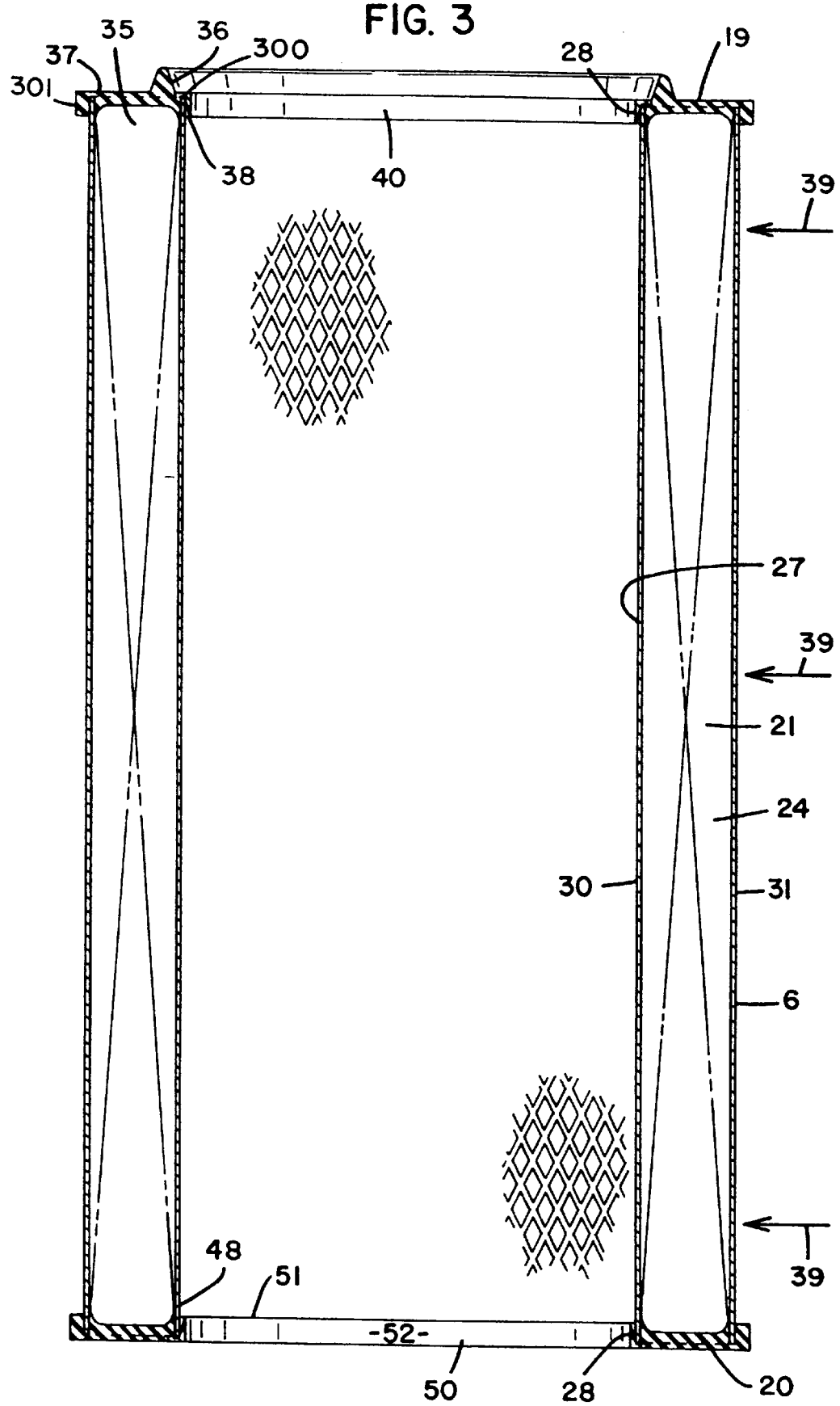

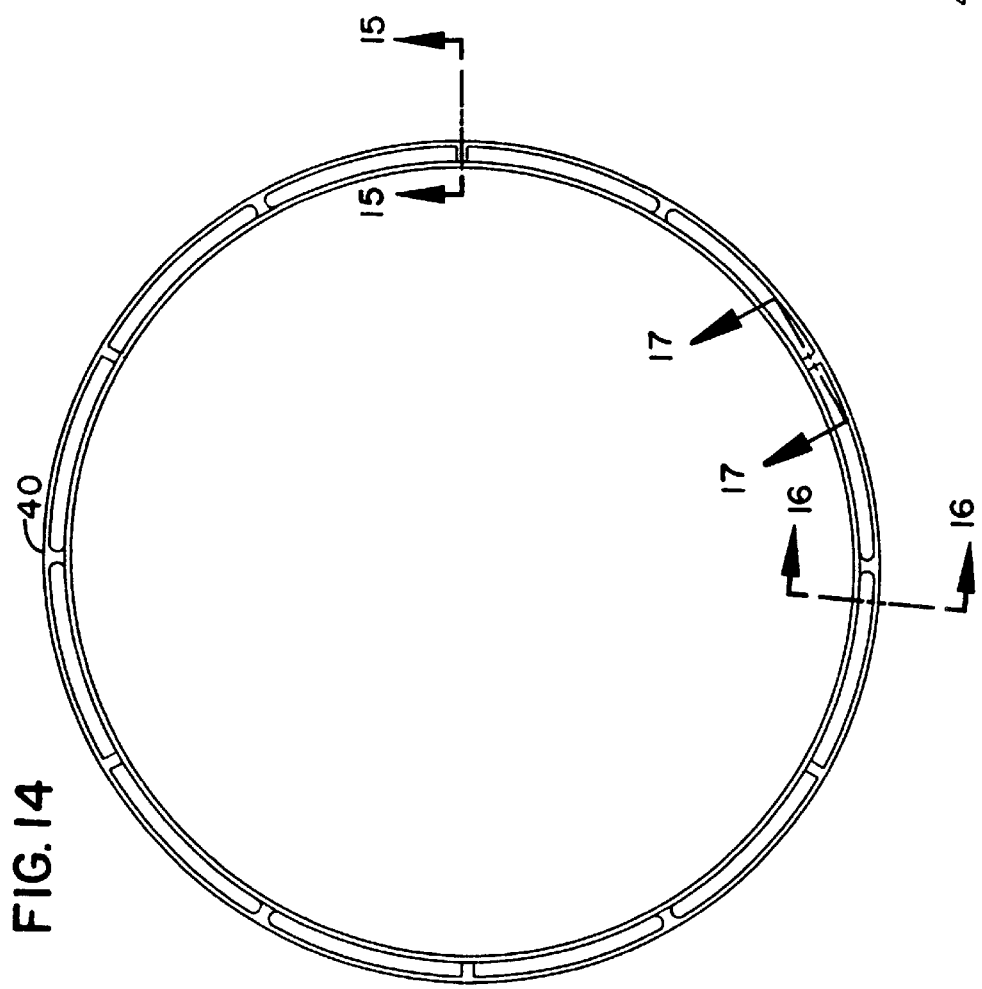

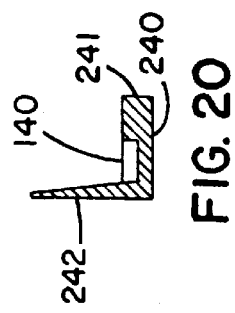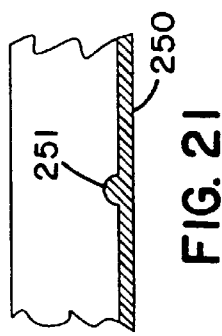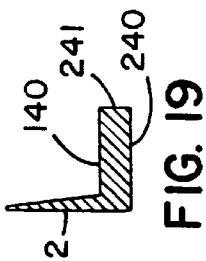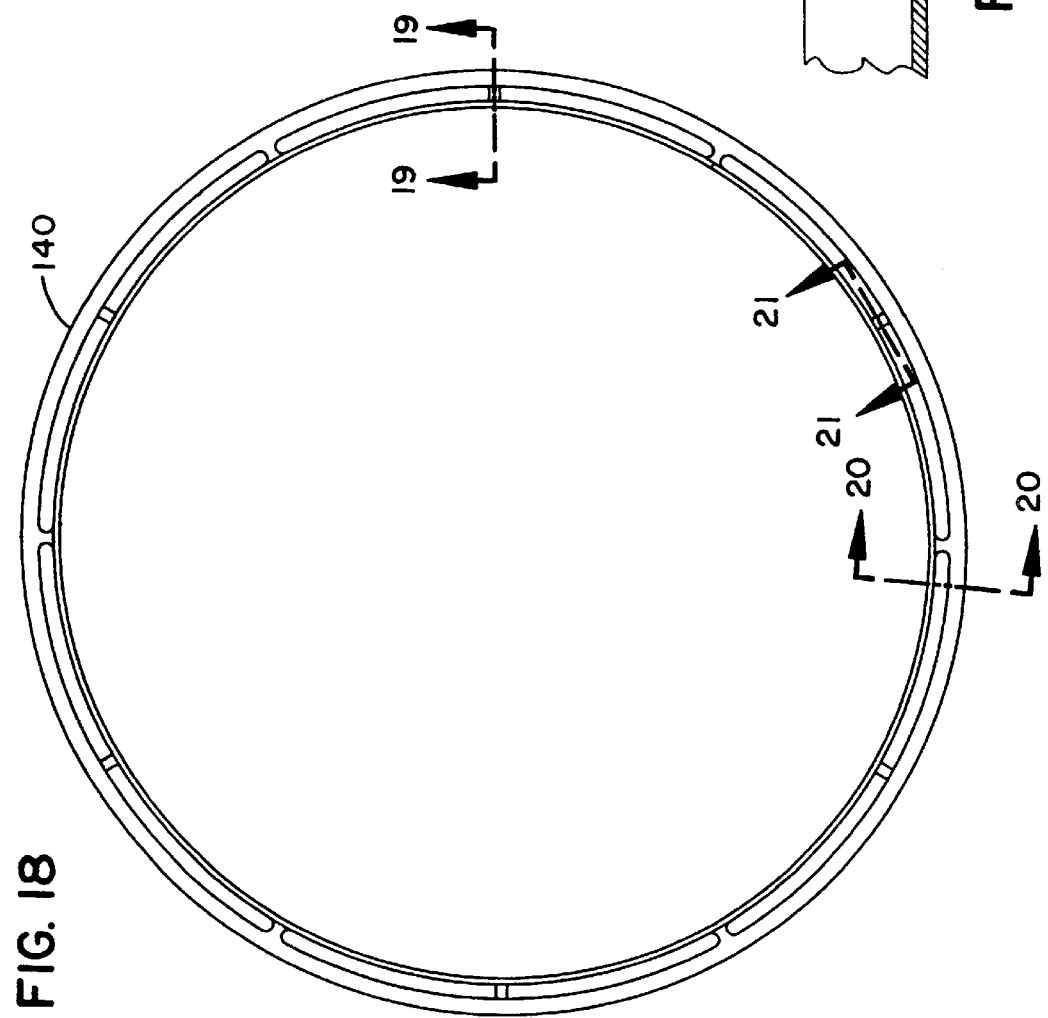

FILTER ELEMENT

CROSS REFERENCE TO RELATED APPLICATIONS

The present application is a continuation of application Ser. No. 08/551,898, filed Oct. 23, 1995, now issued as U.S. Pat. No. 5,803,941. Application Ser. No. 08/551,898 is a continuation-in-part of application Ser. No. 08/371,809 filed Jan. 12, 1995, now abandoned. The disclosures of application Ser. Nos. 08/551,898 and 08/371,809 are incorporated herein by reference.

FIELD OF THE INVENTION

The present invention relates to air filters, and in particular to air filter elements.

BACKGROUND OF THE INVENTION

In many industries, filtering systems are used to filter particulate matter from air or process gases. For example, industrial processes may generate particulate matter that needs to be removed from air in the factory. These filtering systems typically include at least one filter element, which contains filter medium that is useful for entrapping the particulate matter. Examples of such filter elements and their use are found in U.S. Pat. Nos. 4,209,310, 4,218,227, and 4,395,269.

A wide variety of filter elements is known. In general, filter elements have a limited lifetime of use. In other words, after a period of time, filter elements need to be removed and replaced. Once a filter element is replaced, disposal of the used element can be expensive and inefficient.

Typically, used filter elements are transported for disposal to locations other than where they are used. If a used filter element is contaminated with a hazardous material, then disposal is generally more complicated and expensive than if the filter element is contaminated with a non-hazardous material. For example, filter elements contaminated with hazardous materials usually cannot be disposed of in a local landfill. These filter elements typically are disposed of in a hazardous waste landfill or by other hazardous waste disposal means.

In general, industrial filter elements are large, bulky items that are difficult to transport. Due in part to their size and shape, as well as desires to control contamination from material collected on the filter elements, it is standard in those industries using such filter elements to ship contaminated industrial filter elements in 55 gallon drums. Often the size of the filter element is such that only one can be transported per 55 gallon drum. The cost of obtaining and transporting a 55 gallon drum or barrel for every used filter element can be expensive and cost ineffective.

SUMMARY OF THE INVENTION AS DESCRIBED IN THE U.S. PATENT DISCLOSURE

The invention described in the parent disclosure is directed toward a filter element for mounting on a yoke assembly included in an air filter system. The filter element generally includes a central air flow aperture and a first slide construction. The slide construction can be circular and made of a rigid hard plastic. The slide construction has a central mounting rim. This rim is positioned within the central air flow aperture in such a manner that it is oriented to slide on the yoke assembly of an air filter system, when the filter element is installed on the yoke assembly. The central mounting rim can define a circular slide surface, which generally makes contact with the yoke assembly when the filter element is slid onto or off of the yoke assembly.

According to the parent disclosure, preferably a first slide construction is positioned within a first end cap of the filter element in accord with the invention. A second slide construction can also be positioned within a second end cap of the filter element. Preferably, the end caps are made of a soft, compressible, polymeric material. Preferably, the coefficient of friction of the end caps (i.e., the coefficient of friction they would exhibit if they were in sliding engagement with the yoke) is greater than the coefficient of friction of the slide surface that is a part of the slide construction. The first end cap, preferably, has a sealing ring included therein. The sealing ring can generally have a triangular cross section.

SUMMARY OF IMPROVEMENTS

As a result of further studies, some preferred constructions related to those of the parent U.S. application have been developed. Preferably the filter elements are such that the slide ring comprises a support construction, so that the filter element will substantially resist deformation from circular by an amount of 0.5 inches or more, under a load of 50 pounds, and preferably 80–100 pounds as described herein. One possible preferred support construction, to be used for such purposes, is a glass filled polymeric material, most preferably a glass filled nylon. Preferably the material is at least 15%, by weight, glass filled, most preferably about 20%–40%. In this context, resistance to deformation is intended to be characterized when the loading is conducted on a filter element which has been axially sealed to a surface such as a tube sheet. Techniques for evaluating this are provided herein.

Techniques described herein can be applied to a wide variety of filter elements. They are particularly well adapted, however, for use in elements which are cylindrical, with an outside diameter of at least 10 inches (for the end cap of the overall filter element), inside diameter of at least 5 inches (for the air flow aperture in the end cap) and a length of at least 10 inches, and typically 20–30 inches. For example, outside diameters of about 10–15 inches, inside diameters of about 5–10 inches, and lengths of about 20–30 inches can be readily accommodated with techniques described herein. Application to other size elements, however, will be apparent from the descriptions.

Preferably the filter elements include a sealing ring on one end cap, and in typical and preferred systems the sealing ring is positioned about 0.2–0.7 inches (typically 0.25–0.55 inches) from the first end cap central aperture, in a direction toward an outer periphery of the first end cap. This provides for convenient effective sealing in certain commercial systems, with an acceptable level of risk of leaking. The above recited dimensions were particularly developed for elements used in association with TORIT® Downflo® and Downflo®II commercial units.

In preferred arrangements, a second support construction or slide construction is positioned in the second end cap.

BRIEF DESCRIPTION OF THE DRAWINGS

In the drawings, wherein like reference letters and numerals indicate corresponding elements throughout the several views:

FIG. 3 is a cross-sectional view taken generally along line 3—3 in FIG. 2;

FIG. 10 depicting the filter element generally analogous to FIG. 4;

FIG. 14 is a plan view of a support construction according to the present invention and having a preferred configuration for use with a commercial Downflo®I filter system.

FIG. 15 is a fragmentary cross-sectional view taken generally along line 15—15, FIG. 14;

FIG. 16 is a fragmentary cross-sectional view taken generally along line 16—16, FIG. 14;

FIG. 17 is a fragmentary cross-sectional view taken generally along line 17—17, FIG. 14;

FIG. 18 is a plan view of a support construction according to the present invention configured for use in the filter element of a Downflo®II commercial system;

FIG. 19 is a fragmentary cross-sectional view taken generally along line 19—19, FIG. 18;

FIG. 20 is a fragmentary cross-sectional view taken generally along line 20—20, FIG. 18;

FIG. 21 is a fragmentary cross-sectional view taken generally along line 21—21, FIG. 18; and, FIG. 22 is a fragmentary cross-sectional view generally analogous of the view of FIG. 10, but depicting components preferably configured for a Downflo®II commercial system, wherein the support construction is configured as shown in FIGS. 18–21.

DETAILED DESCRIPTION OF THE DISCLOSURE IN U.S. SER. NO. 08/371,809

Figure 1:
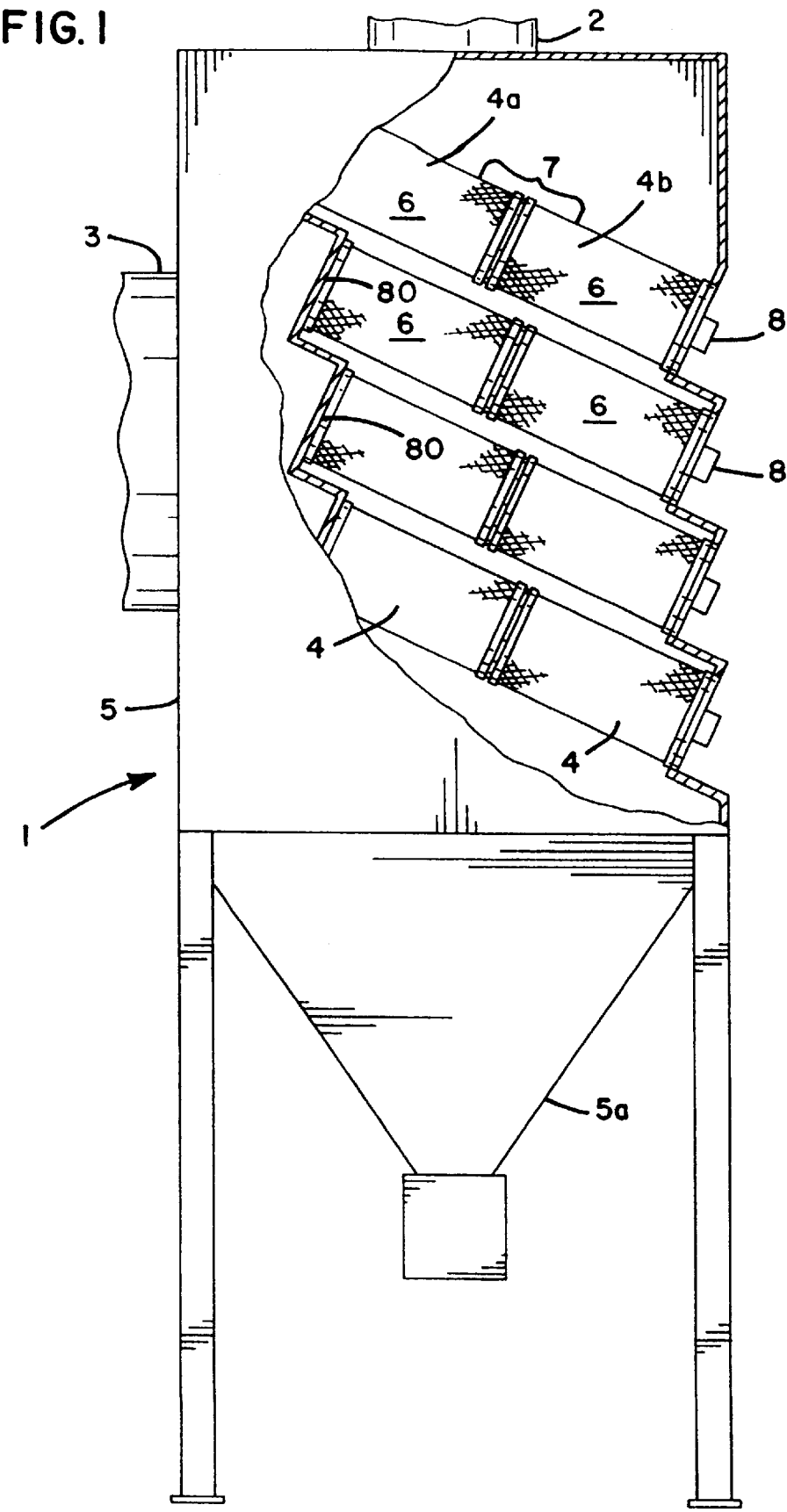
FIG. 1 is a schematic, side elevational view, with portions broken away, of a dust collector including filter elements according to the present invention.

Some Problems with Construction Materials in Filter Elements

In many industries, systems for filtering air and/or other gases laden with dust or other particulate matter generated by industrial processes are necessary. Typically, these types of air cleaning or dust collection systems include a clean air outlet, a dirty air inlet, at least one filter element, a housing for the filter element(s), and constructions for mounting the filter element(s) to the housing. In some instances, arrangements for continuous cleaning (i.e., periodic cleaning conducted without removing the filter element from the housing) are used. An example of a dust collection or air cleaning system of this type is disclosed in U.S. Pat. No. 4,218,227 (the '227 patent), which issued on Aug. 19, 1980 to Robert E. Frey. The specification of the '227 patent is hereby incorporated by reference.

In order to facilitate use of air filters and filter elements in these and other dust collection and air cleaning systems, efforts have been made to reduce the size of air filters and filter elements without compromising the volume of gas that these elements and filters can handle in a short period of time. The extremely large filters and elements are bulky and awkward to handle and difficult to install and replace. Examples of efforts to reduce the size of elements and filters are discussed in U.S. Pat. No. 4,209,310 (the '310 patent), which issued on Jun. 24, 1980 to James Berkhoel. The specification of the '310 patent is hereby incorporated by reference. These efforts to reduce the size of these industrial types of filter elements have been effective, but still generally produce an element that is so large a 55 gallon barrel is needed for transportation of a single element.

In U.S. Pat. No. 4,395,269, which issued on Jul. 26, 1983 to Fredrick Schuler and the specification of which is hereby incorporated by reference, use of elements according to U.S. Pat. No. 4,209,310 are described. For installation, the filter elements are slid onto a yoke or yoke assembly, which provides support for the elements in a filter assembly. When a filter element needs to be replaced, it is removed from the yoke assembly and discarded.

Elements of the type described in U.S. Pat. No. 4,209,310 and U.S. Pat. No. 4,395,269, are typically not easily discarded, in part because they are not easy to crush for disposal. Thus, used elements are usually transported from the industrial environment to a disposal site in 55 gallon drums. Typically, only one element is transportable per drum because the construction materials included in each element keep the element from being easily crushed to conserve space.

In many instances, the structural portions of the filter element which render it difficult to crush are the end caps. In particular, many filter elements utilized in industrial filter systems have metal end caps. The metal end caps are difficult to crush without specialized equipment capable of applying relatively high pressures. (A similar problem would be encountered if a hard rigid plastic were used as the end cap material.) One can imagine alleviating the problem of metal end caps by providing end cap material not as rigid as metal end caps. However, there can be problems with this.

In particular, when the filter element is slid on and off a yoke assembly, for example of the type described in U.S. Pat. No. 4,395,269, the sliding or mounting action involves sliding contact between the end cap(s) and portions of the yoke assembly. When both the end cap(s) and the portions of the yoke assembly engaged during the sliding action are made of metal (or hard plastic), the mounting or sliding is relatively easy to effect. That is, the coefficient of friction between the metals of the end cap and the yoke is generally sufficiently low that it can be easily overcome by forces manually applied; i.e. the portions of the end caps and the yoke which engage one another during assembly are generally smooth.

However, if the metal of the end cap is replaced by a soft, compressible polymeric material which can be easily crushed, the engagement during the sliding or mounting between the filter element and the yoke assembly involves a sliding engagement between the polymeric material and the material of the yoke assembly. When the polymerical material is a soft, rubbery material:

(1) the sliding engagement can easily damage the end cap; and (2) the rubbery material will tend to provide high coefficient of friction (with the yoke) and thus will resist sliding. This can make the element very difficult to install and seal in place.

Some Advantageous Constructions of U.S. Ser. No. 08/371, 809

According to U.S. Ser. No. 08/371,809, now abandoned, preferred filter element constructions are provided. These preferred constructions are: (1) relatively easy to mount on yoke assemblies, such as the type described in U.S. Pat. No. 4,395,269, wherein portions of the filter element must slide along portions of the yoke during mounting, and (2) relatively easy to crush after use, for disposal. In particular, advantage is taken of relatively soft, high friction polymeric material in end caps, with respect to its sealing ability, ease of construction, and ease of crush. At the same time, however, the filter element is provided with an arrangement so that the relatively soft, compressible polymeric end cap material is protected from sliding engagement with portions of the yoke or housing, when the elements are assembled and removed in dust collectors.

In particular preferred embodiments, filter elements are provided which can be readily crushed at a factory or facility where they are employed for filtering, without the use of special equipment for crushing, if desired. This is accommodated by providing materials, in a construction for the filter elements, which can be crushed under the weight of an average worker. That is, they can be readily crushed simply by the worker standing on or stamping on the filter element. Specific constructions provided herein, for example, can be readily crushed under the weight of a 150 pound worker while standing or jumping on the element.

The reference numeral 1 in FIG. 1, generally depicts an industrial dust collector or air filtration system including filter elements according to the disclosure of U.S. Ser. No. 08/371,809. Except that the filter elements are as described herein with respect to FIGS. 2–9, arrangement 1 may be generally as described in U.S. Pat. No. 4,395,269. Contaminated air or process gases enter the dust collector 1 at dirty air inlet 2, and filtered air or gases exit the collector 1 at the clean air exit 3. FIG. 1 depicts a side view with portions of housing 5 broken away so that filter elements 4 are viewable. Much of the particulate matter filtered from the air or gases drops from the filter elements 4 and is collected in funnelled housing 5a for removal. In FIG. 1, eight filter elements 4, two of which are sub-labelled 4a and 4b, can be viewed.

The arrangement shown in FIG. 1 is generally of "forward flow" filter elements 4. Thus, air to be filtered enters each filter element 4 by passing through filter media contained therein to an open central portion of the filter element 4. The filter element 4 includes an air flow aperture so that filter air can exit the central portion. The purified airstream on the end filter element is then directed as desired, for example to the environment. Thus, for arrangements such as that shown in FIG. 1, contaminating material is generally collected on the outer surface 6 of each filter element 4. It will be understood that the arrangement 1 of FIG. 1 is schematic to show positioning of the filter elements 4, and details such as pulse cleaning equipment are not shown. In general, when pulse cleaning equipment is used, periodically some particulate matter is blown off each filter element 4, to fall into funnelled housing 5a.

Still referring to FIG. 1, it can be readily seen that the filter elements 4 are oriented in coaxially aligned pairs. For any given pair, for example top pair 7, access to the pair, for removal from arrangement 1, is obtained by means of a cover or retainer 8. In particular, to remove filter element pair 7 from arrangement 1, retainer 8 is removed. This will be better understood by reference to FIG. 5.

Figure 5:
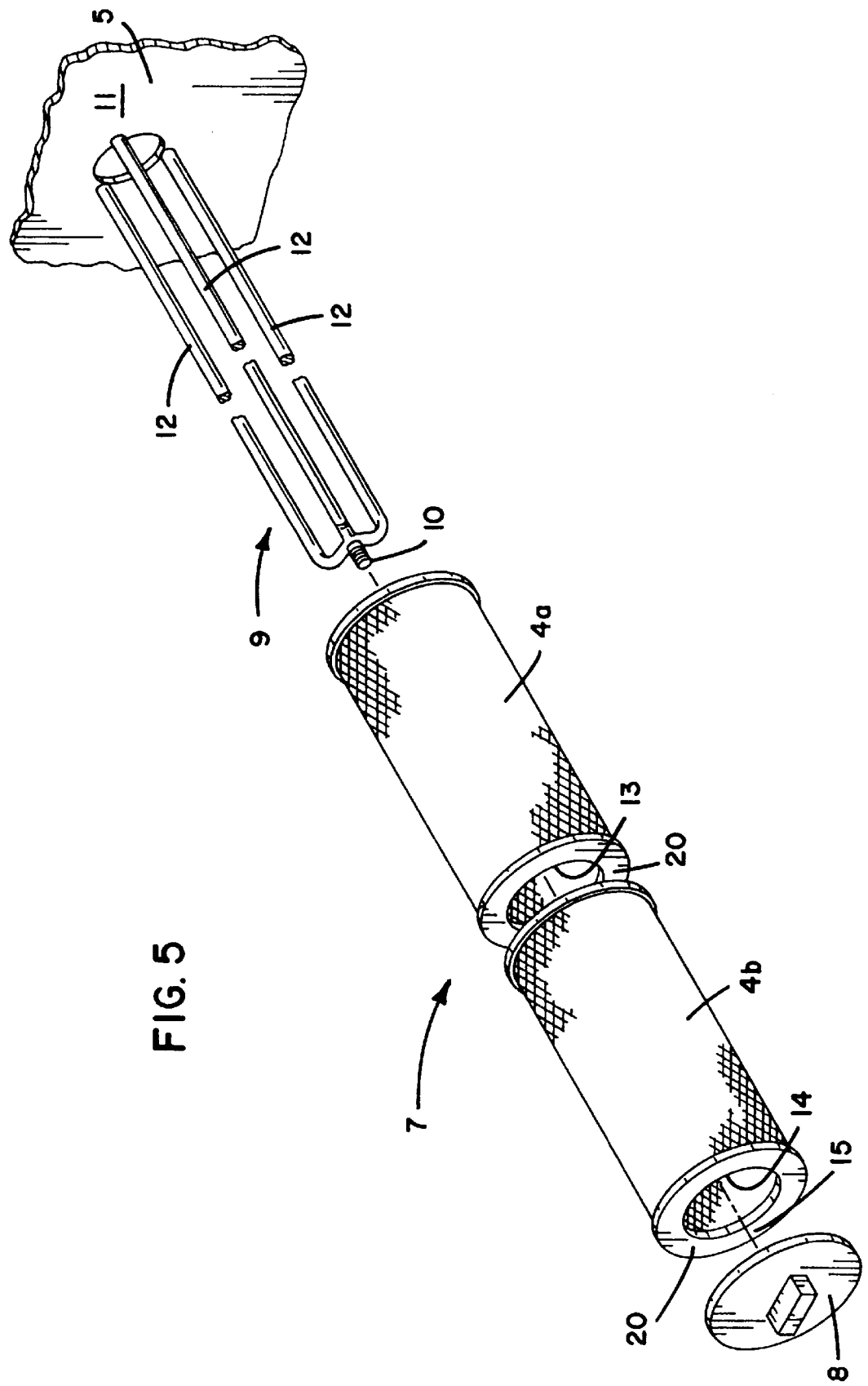
FIG. 5 is an exploded, fragmentary, schematic perspective view depicting filter elements according to a preferred embodiment of the present invention mounted in a dust collector.

Referring to FIG. 5, filter element pair 7 is depicted, in exploded perspective view, in relation to portions of arrangement 1 into which it is mounted. In particular, filter elements 4a and 4b are mounted on yoke assembly 9, and are retained thereon by retainer 8. Yoke assembly 9 is mounted on housing surface 11, which is included in the housing 5. Specifically, yoke assembly 9 includes a threaded member 10 oriented for engagement within a threaded bore, not viewable, in retainer 8. During assembly, then, retainer 8 is tightened on threaded post 10 sufficiently to secure filter elements 4a, 4b on yoke assembly 9, more particularly on guide rods 12. Numeral 4a in FIG. 5 depicts the element 4 that is adjacent to housing 5 and housing surface 11. Numeral 4b in FIG. 5 depicts the element 4 that is adjacent to retainer 8.

Preferably, sufficient force against filter element 4b is provided by retainer 8, in order to provide for sealing engagement between filter elements 4a and 4b and also between filter element 4a and surface 11. Also, preferably sealing engagement is provided between retainer 8 and filter element 4b. In this manner, unfiltered air is prevented from entering central portions 13 and 14 of filters 4a and 4b respectively.

From a comparison of FIGS. 1 and 5, it will be understood that during mounting of filter elements 4a and 4b, an operator would need to supply sufficient force to overcome the coefficient of friction between the yoke assembly 9 and the portions of filter elements 4a and 4b which slidably engage yoke assembly 9 as installation is made. In particular, referring to FIG. 1, the sliding action is directed upwardly (i.e., the operator needs to push the filter elements 4 upwardly, as they are being slid onto the yoke assembly 9). If the coefficient of friction between the filter elements 4a, 4b and yoke assembly 9 is relatively high, then the operator would need special equipment to push elements 4a and 4b along yoke assembly 9 during mounting. Indeed, if the friction was too great, damage to either yoke assembly 9 or filter element 4a, 4b could occur during mounting. Also, a relatively high coefficient of friction between filter elements 4a, 4b and yoke assembly 9 can provide for difficulty in obtaining good seals between: elements 4a and 4b; element 4a and surface 11; and between retainer 8 and element 4b. That is, it would be difficult to supply sufficient compressive force by means of retainer 8, to ensure good sealing where needed.

As will be understood from detailed descriptions provided below, for arrangements such as those shown in FIGS. 1 and 5, the sealing engagements needed are provided by axial forces directed between retainer 8 and surface 11, along the direction of axis 15, which is pictured in FIG. 5. The compressive forces are provided, then, by tightening retainer 8 sufficiently that the coefficient of friction between filter elements 4a, 4b and yoke assembly 9 is overcome and the axial compressive forces control. That is, if the coefficient of friction between the filter elements 4a, 4b and yoke assembly 9 is too great, it would be difficult for the operator to tighten retainer 8 sufficiently to ensure good sealing.

In conventional arrangements, engagement between a filter element and the yoke assembly is provided by the filter element end caps. Typically, the end caps each include a smooth inner rim or edge that slides along the yoke assembly during mounting. If, as in conventional arrangements, both the yoke assembly and the filter element end caps are made from smooth materials, such as smooth metal, then the sliding engagement is relatively easy because the coefficient of friction between the two is relatively low. However, as indicated earlier, filter elements with metal end caps are difficult to crush. Also, it should be apparent that if the portion of the filter element, for example the end cap, which engages the yoke assembly during the sliding movement, is of a soft polymeric material which exhibits a relatively high coefficient of friction, it can be very difficult to mount the filter elements in position.

As will be apparent from the descriptions with respect to FIGS. 2–4 and 6–9, preferred filter elements 4 are constructed so that: soft polymeric material which is advantageous for crushing purposes is used in the end caps of the filter element; while, at the same time, a construction is provided to prevent the soft polymeric material from coming into contact, during sliding engagement, with yoke assembly 9, in a manner inhibiting mounting of elements 4.

Figure 2:
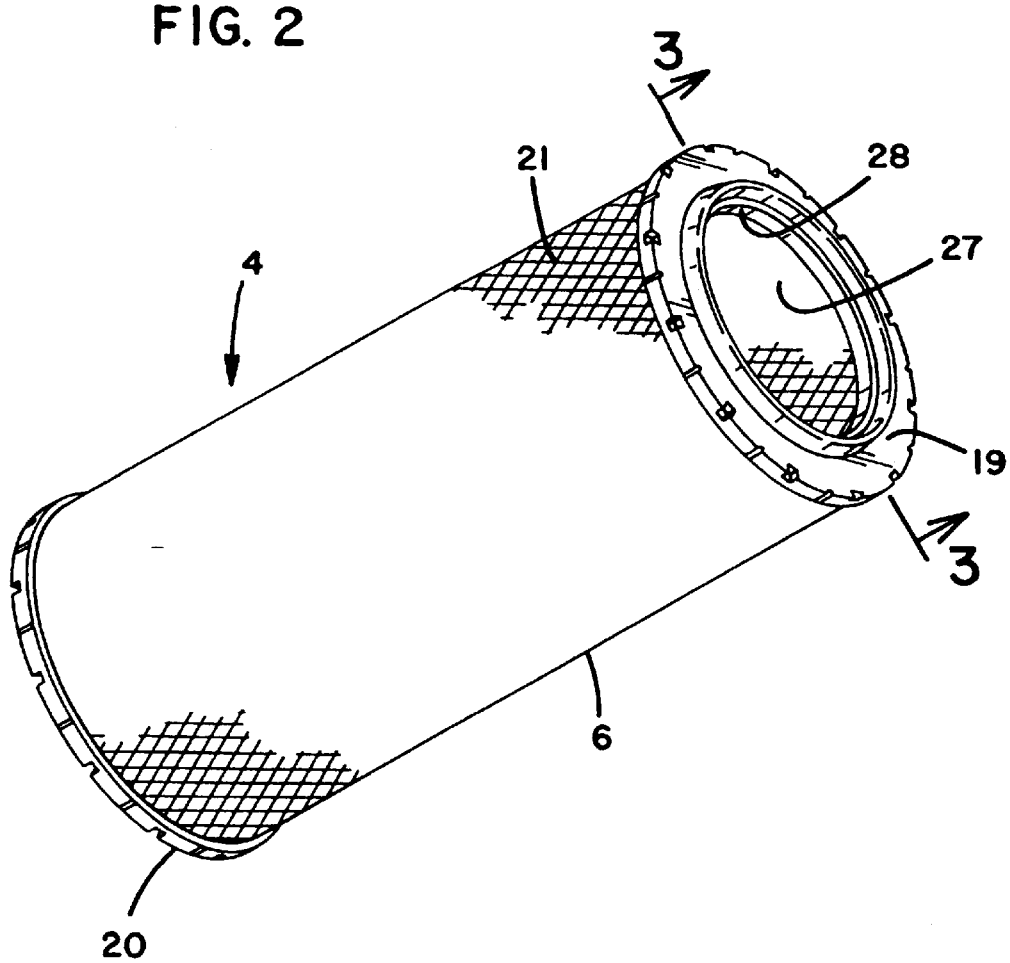
FIG. 2 is a perspective view of a filter element according to a preferred embodiment of the invention.

Referring to FIG. 2, filter element 4 is depicted in perspective. The particular filter element 4 depicted is generally a cylindrical filter element having first and second end caps 19 and 20, respectively, with filter media 21, which is shown in FIG. 3, enclosed therebetween. Filter media 21 can be any filter media useable in an industrial filter element. For example, the pleated paper filter media disclosed in the '269 patent is usable in the invention.

In general, for the arrangements shown in FIGS. 1 and 5 as indicated earlier, the filtering function is provided by directing air to be filtered against the outer surface 6 of element 4. Air reaching interior 27 of filter element 4, then, has been filtered. Filter element 4 includes a central air flow aperture 28 through which filtered air can pass. As will be seen in FIG. 3, an air flow aperture 28 is provided in each end cap 19 and 20. The apertures 28 also provide for extension of portions of yoke assembly 9 therethrough during mounting as best viewed in FIG. 5.

In FIG. 3, a cross-sectional view of filter element 4 is provided. For the particular arrangement shown in FIGS. 2 and 3, the filter media 21 comprises a cylindrical extension 24 of pleated paper. Element 4 includes inner and outer liners 30 and 31, respectively. The inner and outer liners 30 and 31 extend between end caps 19 and 20. Filter media 21 is positioned between inner and outer liners 30 and 31 in a conventional manner. In preferred constructions such as the one depicted in FIG. 3, the inner and outer liners 30 and 31 comprise perforated materials well-known in the filter element industry. Typically, these materials include perforated metal sheets or expanded metal screen arranged cylindrically.

Still referring to FIG. 3, first end cap 19 encloses end 35 of media 21. End cap 19 comprises a polymeric material in which filter media 21 and liners 30 and 31 are potted. In general, the polymeric materials included in end cap 19 flows during assembly of the filter element providing a bond among filter element components in proximity of end cap 19.

Polymeric materials that can withstand the forces exerted on end caps of a filter element while in use, that can maintain their integrity when exposed to contaminated air, and that can allow the filter element to be easily crushed (as described) are usable in the invention. In general when filter elements according to the present invention are described as "easily crushable" it is meant that they are relatively easily crushed under forces applied generally perpendicularly to a central longitudinal axis of the element; i.e. forces directed along the direction of arrows 39, FIG. 3. Preferably the element is such that crushing can be accomplished, if desired, simply by a person standing on, or stamping on, the element, although mechanical crushers could be used. It is preferred that the elements be constructed of materials such that crushing readily occurs under forces easily applied by a 150 pound person either standing or stamping on the element. Typically, filter elements of the invention also crush in such a manner that the dimension of the crushed filter (if measured in the direction crushing forces are applied) is no greater than about one-third of its original dimension. Therefore, if necessary, about three contaminated industrial size filter elements can be transported in a 55 gallon drum or barrel. Whereas, without crushing, only one industrial size filter element would fit into a 55 gallon drum.

A variety of polyurethanes, polypropylene, polyethylene, polyesters, nylons, polytetrafluroethylene, polyvinylidene fluoride, polyamideimide and mixtures thereof are useable polymeric materials for end caps in filter elements according to the invention. Preferably, soft foamed polyurethanes are used. A preferred material for end cap 19 is a soft polymeric urethane material, such as hydrofluorocarbon (HFC) blown BASF I-35453R resin available from BASF Corp. in Wyandotte, Mich. It is noted that a water blown resin available from BASF having about the same density is also usable. In particular, the polyurethane used should be processed to an end product having a molded density of about 14–22 pounds per cubic foot (lbs/ft$^3$) and a hardness of about 10 to 40, Shore A. The most preferred polyurethane comprises a material made with the I-35453R resin and I-3050U isocyanate also available from BASF Corp. The materials should be mixed in a mix ratio of 100 parts I-35453 resin to 36.2 parts I-3050U isocyanate (by weight). Typically the specific gravity of the I-35453 resin is 1.04 (8.7 lbs/gallon), and for the isocyanate it is 1.20 (10 lbs/gallon). The materials are typically mixed with a high dynamic shear mixer. The component temperatures are typically about 70–95° F., and the mold temperature is typically about 115–135° F.

For the particular arrangement shown in FIG. 3, end cap 19 includes sealing ring 36. Sealing ring 36 extends outwardly (axially) form first surface 37 of first end cap 19. More specifically, preferably sealing ring 36 is molded as part of first outer surface 37. Collectively, end cap 19, filter media 21, and inner liner 30 define a central aperture 38 (which comprises one of apertures 28, FIG. 3). Filter element 4 includes, positioned in aperture 37, slide construction 40. The slide construction 40 can be better understood by referring to FIG. 4, an enlarged view of a portion of FIG. 3.

Figure 4:
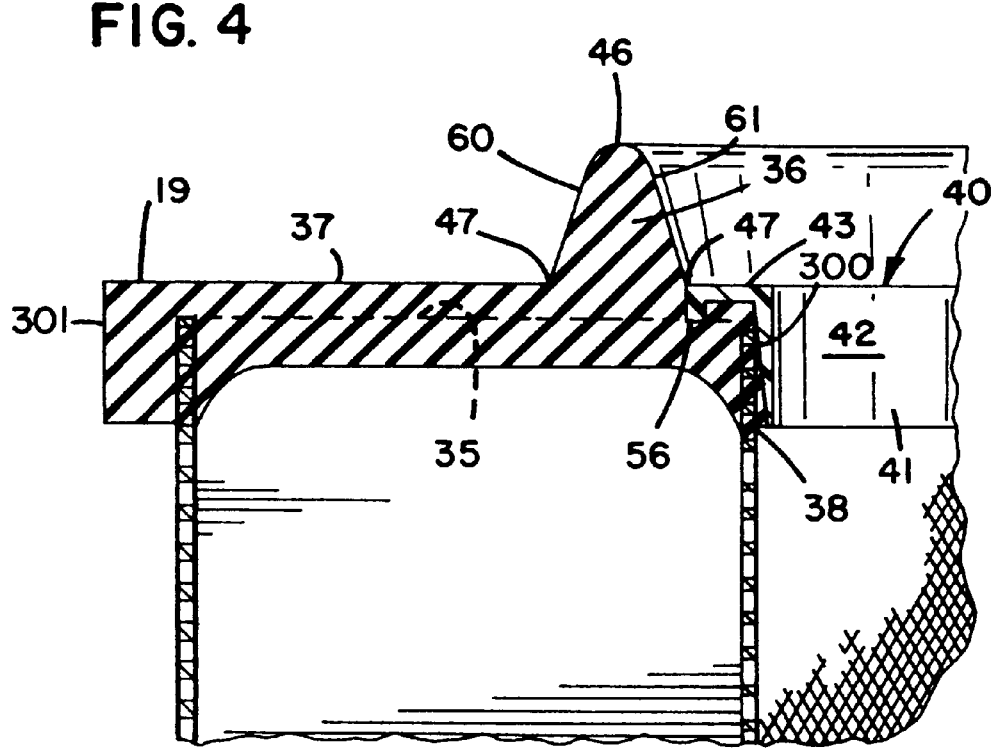
FIG. 4 is an enlarged fragmentary view of a portion of FIG. 3.

Referring to FIG. 4, slide construction 40 includes central mounting rim 41. The central mounting rim 41 is positioned within aperture 38 (which in part comprises one of apertures 28), and is oriented to provide a surface of engagement between filter element 4 and yoke assembly 9, when filter element 4 is slid upon yoke assembly 9 as best represented in FIG. 5. In particular, central mounting rim 41 includes slide surface 42, which is oriented for sliding engagement with yoke assembly 9 during mounting. For the arrangement shown, slide surface 42 is circular (or annular) and is preferably constructed from a material which will present a relatively low coefficient of friction in slide engagement with yoke assembly 9, to facilitate mounting and which will not easily be damaged from sliding action.

Sliding construction 40 can also function to facilitate maintenance of the filter element 4 construction and shape. Without sliding construction 40, filter element 4 could deform and lose its shape. For example, some filter elements made of crushable materials could tend to deform while being transported, and during filter element installation and removal.

Sliding construction 40 can also function to provide support to sealing ring 36 and to provide a better seal around the top of pleated filter media 35. In some filter element constructions that do not have sliding construction 40, the flowable polymeric material that is included in the end caps might not provide a sufficient seal around the top of the filter media, and thus leakage could occur around the insufficient seal.

As will be better understood from detailed descriptions below, preferably central mounting rim 41 is made from a hard plastic or polymeric material, such as polystyrene, so that the relatively hard, smooth material functions as slide surface 42. Typically and preferably, the entire slide construction 40 will be molded from such a material.

For the particular arrangement shown in FIG. 4, slide construction 40 includes end 43 which is potted within end cap 19 during construction to secure slide construction 40 in place.

Figure 10:
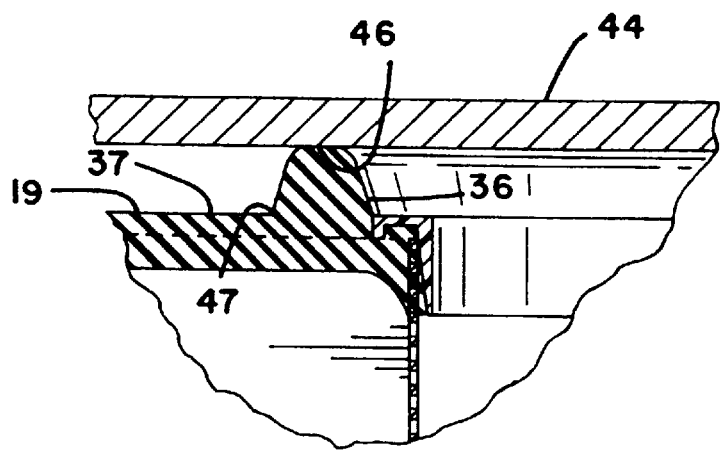
FIG. 10 is an enlarged fragmentary cross-sectional view of a filter element according to a preferred embodiment of the present invention shown, schematically, in sealing combination with a structure.

FIG. 10 depicts an enlarged fragmentary section analogous to FIG. 4. Unlike FIG. 4, however, FIG. 10 shows a structure 44, such as a filter element 4 or a surface 11, that is in sealing contact with sealing ring 36, to depict how sealing ring 36 operates. Structure 44 could be, for example: surface 11, FIG. 5; or an end of an adjacent filter element. As shown in FIG. 10, sealing ring 36 is constructed in such a manner that it can withstand the compressive forces enacted when filter elements 4 are mounted and secured in place on yoke assembly 9. Generally, sealing ring 36 is constructed so that it is appropriately compressed to form a good seal. Sealing ring 36 is preferably constructed in such a manner that the compressive forces that impact the sealing ring from the top 46 are dispersed throughout the base 47 of sealing ring 36. (In the particular embodiment shown, tip 46 is rounded. It can be made, for example, as a circular radius. For the example described below, it was made to correspond to a radius of 0.125 inches.) The base 47 of sealing ring 36 is preferably molded as part of end cap 19; therefore, when the compressive forces are dispersed throughout the base 47, they are absorbed by end cap 19. However, the broad base 47 of seal ring 36, where the ring 36 engages a remainder of end cap 19, ensures that the forces are broadly dispersed in end cap 19, so they are not directed or focused too narrowly on portions of filter media 21 or liners 30 and 31. This helps to ensure structural integrity. As best viewed in FIG. 4, and discussed more fully below, slide construction 40, and in particular end 43, provides some lateral support for sealing base 47.

Referring to FIG. 3, filter element 4 includes a second end cap 20 that is analogous to first end cap 19; however, for the particular element depicted, second end cap 20 does not have a sealing ring analogous to ring 36. Second end cap 20 is sealed by whatever structure secures the filter element 4 in place in the dust collector or air filtration system. For instance, as depicted in FIG. 5 filter element 4a is to be secured into place and thus sealed by filter element 4b. Thus, second end cap 20 of filter element 4a is sealed by the sealing ring 36 of filter element 4b (not viewable in FIG. 5). Therefore, it is not necessary for the second end cap to have a sealing ring.

In the alternative, filter element 4 may be secured into place (and thus sealed) by a securing mechanism included in the dust collector or filtration system. More particularly, as depicted in FIG. 5, second end cap 20 of filter element 4b is sealed by retainer 8. Retainer 8 would either have a sealing ring attached thereon, or an O-ring would be provided between the retainer 8 and element 46. Therefore, generally, for the particular embodiment depicted it would not be necessary for second end cap 20 to have a sealing ring. Second end cap 20 comprises a polymeric material in which filter media 21 and liners 30 and 31 are potted. As with first end cap 19, a preferred material for end cap 20 is a soft polymeric polyurethane material. Indeed, the same material can be used for both end caps.

Referring to FIG. 3, for the particular embodiment shown, collectively, end cap 20, filter media 21, and inner liner 30 define aperture 48 (which in part comprises one of central apertures 28, FIG. 3). Filter element 4 includes, positioned in aperture 48, second slide construction 50. Slide construction 50 is analogous to slide construction 40. Thus, slide construction 50 includes a central mounting rim 51, positioned within aperture 48, and oriented to provide a slide surface 52 for engagement between filter element 4 and yoke assembly 9, when filter element 4 is slid upon yoke assembly 9 as is represented in FIG. 5. Slide surface 52 is preferably constructed from a material as described for slide surface 42, which will present a relatively low coefficient of friction in engagement with yoke assembly 9, to facilitate mounting. Indeed in typical and preferred applications, slide constructions 40 and 50 will be identical.

In preferred embodiments, slide constructions 40 and 50 are constructions that easily break or crush (under lateral forces directed as shown by arrows 39, FIG. 3) when the filter element 4 is crushed prior to disposal. In order to facilitate easy crushability, the constructions 40 and 50 should be relatively thin and made of a material that allows the constructions 40, 50 to readily crush when the filter element 4 is crushed. In addition, end caps 19 and 20 should also be made of materials and thicknesses that allow them to perform their proper functions but also that allow them to crush when filter element 4 is crushed prior to disposal. The materials described are appropriate for this.

Figure 6:
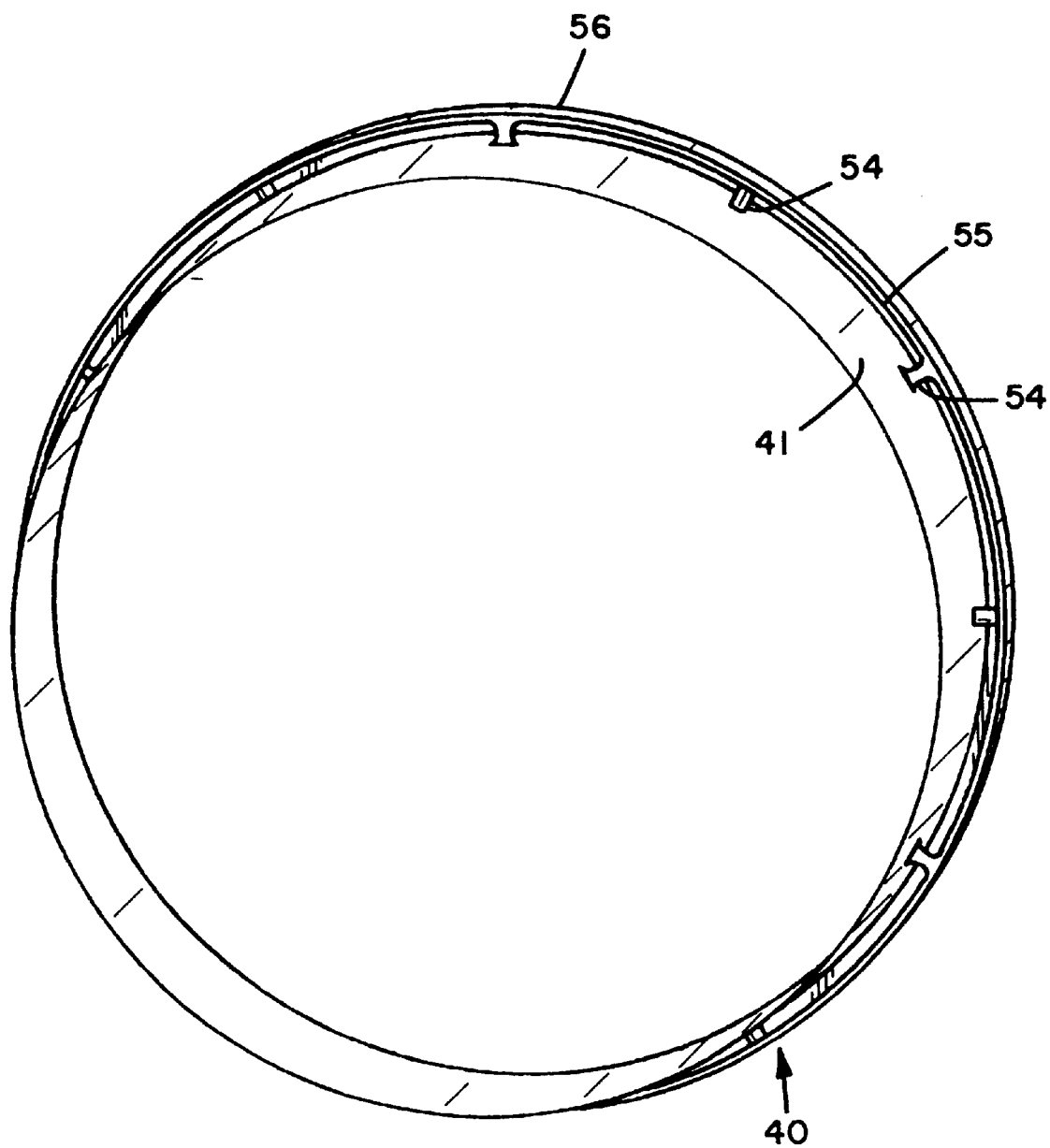
FIG. 6 is a perspective view of a component of the filter element depicted in FIG. 2.
Figure 7:
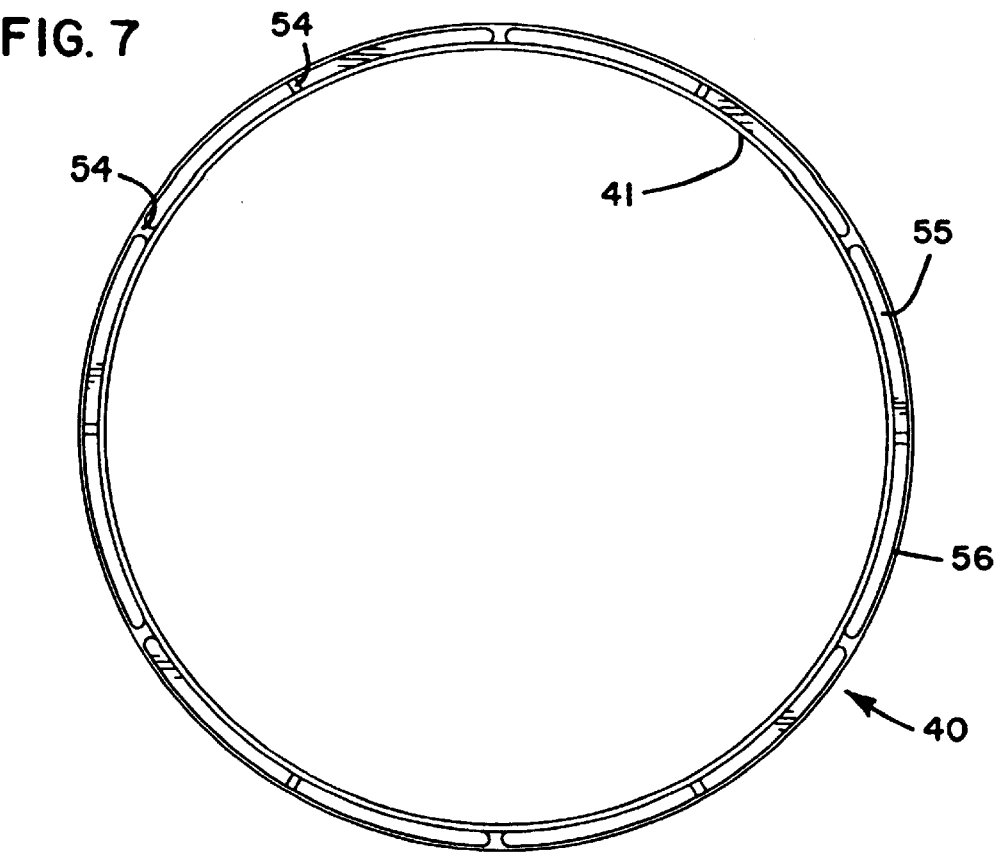
FIG. 7 is a bottom plan view of the component of FIG. 6.
Figure 8:
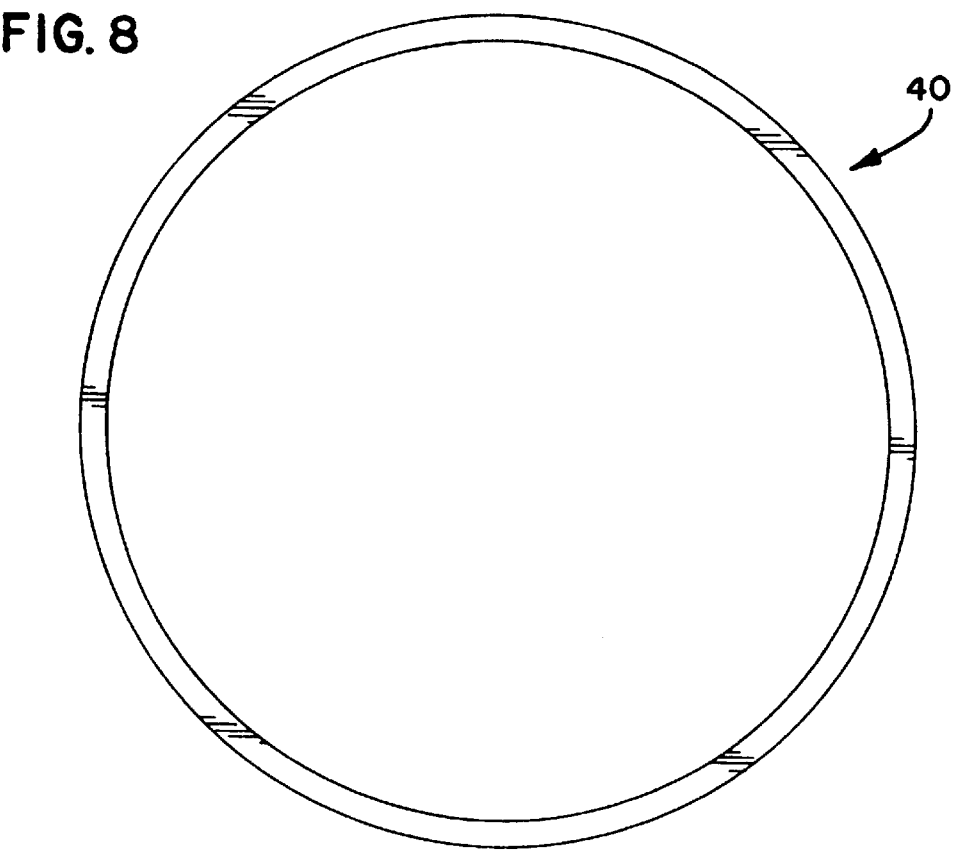
FIG. 8 is a top plan view of the component of FIG. 6.

Slide construction 40, and by analogy slide construction 50, are depicted in greater detail in FIGS. 6–8. FIG. 6 is a perspective view of slide construction 40. FIG. 7 is a bottom view of slide construction 40, and FIG. 8 is a top view of slide construction 40. FIGS. 6 and 7 show that a preferred slide construction of the invention has standoffs 54 adjacent to central mounting rim 41 and on the underside of bottom surface 55.

From a review of FIGS. 4 and 7, it will be apparent how standoffs 54 facilitate production of filter elements 4 of the present invention. In particular, standoffs 54 will be engaged by inner liner 30 during the molding process. In other words, when end cap 19 is molded from a polymeric material, slide construction 40 and inner and outer liners 30 and 31 respectively will have been positioned in the mold, along with filter media 21, and the polymeric material of the end cap. Standoffs 54 will support liner 30 and prevent it from projecting through the polymer of the end cap as it cures.

A similar function is provided with respect to the filter paper 24 by the outermost rim or ring 56 on the slide construction 40. Referring to FIG. 4, this outer rim 56 is viewable in cross-section engaging end 35 of the filter media 21. When the filter media 21 is filter paper 24, rim 56 will prevent the end 35 of the filter paper from dropping through end cap 19, as it is cured in the mold. Thus, surface features of the slide construction 40 facilitate molding of the filter element 4 according to the present invention.

In order to provide an optimally wide base for absorbing compressive forces that are disbursed through base 47, and to better facilitate disbursement of the compressive forces on the top 46 of sealing ring 36, applicants have found that the width of the cross section of the base 47 should be greater than the width of the cross section of the top 46 of sealing ring 36. This difference in cross section widths can best be viewed in FIGS. 4 and 10. (The cross sections of many conventional sealing rings are either circular or rectangular. Circular ones can provide an insufficiently wide base for which to disburse compressive forces while the sealing ring 36 is compressed.)

Alternatively, some conventional sealing rings can have a rectangular cross section, in which the cross section has a uniform width. Although this type of sealing ring could have a sufficiently wide base for disbursement of compressive forces, the top width could be insufficiently narrow to focus the compressive forces of the point of contact for sealing.

Most preferably, sealing ring 36 has a triangular cross section to provide the advantages of both a broad base and a narrow top. More particularly, the width of base 47 should be at least 0.5 inches. Preferably a height-to-width ratio of at least 1:1 is used. Indeed, a ratio of 1:1 is preferred. Preferred triangular cross sections are generally ones in which the "sides" 60, 61 (FIG. 4) extend upwardly at the same angle or slant. For the preferred embodiment, in the Example described, an angle of 15.89° from perpendicular was used.

Further, typically and preferably, the height of ring 36 is such that it compresses about 50% when compressed during air filtration operations. The height of the sealing ring 36 can be varied as needed. However, for typical applications such as in our application, the height of the sealing ring 36 when viewed as a cross section will be about 0.50 inches.

Figure 9:
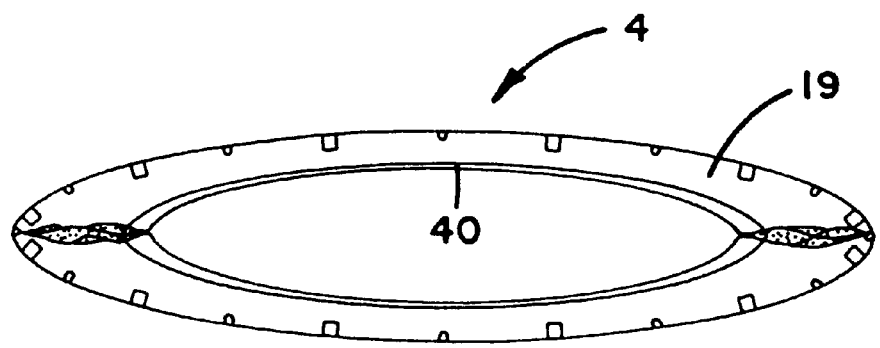
FIG. 9 is a schematic end view of a crushed filter element according to FIG. 2.

As discussed previously, it is convenient and advantageous to provide a filter element 4 that is easily crushable prior to disposal. This would allow more than one to fit into one 55 gallon barrel or drum. Further, it would save time and equipment if these filter elements can be crushed by an average person. Therefore, most preferably, the filter elements can be crushed by a person weighing 150 pounds or more. In FIG. 9 an end view of element 4 after crushing is shown. The end cap 19, the slide construction 40, and the sealing ring 36 are all made of materials having thicknesses that allow these parts of the element to have been easily crushed.

It is to be understood that although numerous characteristics and advantages of the invention have been set forth in the foregoing description together with details of the structure and function of the invention, that the disclosure is illustrative only. Changes may be made in detail, especially in matters of shape, size and arrangement of parts within the principles of the invention to the full extent indicated by the broad general meaning of the terms in which the appended claims are expressed. For example, the filter elements of the invention do not necessarily have to be cylindrical as depicted in the preferred embodiments in the Figures. Further, the height and outer perimeter distances of the elements can be varied.

Example from U.S. Ser. No. 08/371,809

Applicants constructed a cylindrical industrial size filter element 4 of the invention with dimensions and materials as follows. This filter element 4 was 26 inches long as measured from the top surface 37 of end cap 19 to the bottom of second end cap 20. It was circular in cross-section and had an outer diameter of about 14.04 inches. The top and bottom end caps 19 and 20 were cylindrical and molded from a polyurethane material including hydrofluorocarbon blown BASF I-35453R resin available from BASF Corp. Included in top end cap 19 was sealing ring 36, which had a triangular cross section. Further, the distance from the base 47 of sealing ring 36 to the top 46 of sealing ring 36 was about one-half inch. The ratio of the width of base 47 to the height was 1:1.

A circular sliding construction 40 was positioned in central aperture 38. This sliding construction 40 had a circular central mounting rim 41 and a slide surface 42. The rim had a thickness of 0.6" tapering to 0.008" at the edge away from end 43. The sliding construction 40 was positioned in central aperture 28 in such a manner that slide surface 42 made contact with yoke assembly 9 when filter element 4 was slid onto or off of yoke assembly 9. Sliding construction 40 was also positioned is such a manner that first end cap 19 did not make contact with yoke assembly 9 when filter element 4 was slid onto or off of yoke assembly 9. Slide surface 42 was made of a material allowing filter element 4 to easily slide on and off metal yoke assembly 9. In particular, a polystyrene was used. More specifically, slide construction 40 was molded from grade 333 high impact polystyrene available from Huntsman Chemical Corporation. This high impact polystyrene has a hardness of about 15 Rockwell [M] (i.e., on the Mohs scale), pursuant to the publicly available Huntsman product specification. The inner diameter of rim 41 is used as a liner guide during the molding process of assembling the media liner face.

Potted into first end cap 19 were an inner liner 30, an outer liner 31, and a pleated paper filter media 24. The filter media used was in some instances a cellulose and in other instances a synthetic media made under the auspices of Donaldson Co., Inc. and commercially referred to as Ultra Web® or Ultra-Tech®. Pleated paper filter media 24 was enclosed on one side by inner liner 30, on the other side by outer liner 31, on the top by first end cap 19 and on the bottom by second end cap 20.

Second end cap 20 was analogous to first end cap 19. However, second end cap 20 did not have a sealing ring 36. Slide construction 50 was identical to construction 40.

The element was mounted in a Downflo® or TD® filter system, available from Donaldson Co., Inc., and was found to function appropriately. More specifically, DF and DFT models or TD 1150-6120 model filter systems can include the filter elements of the invention.

Improvements and Further Findings

Since the filing date of parent application Ser. No. 8/371, 809, further evaluation and experimentation have been conducted with arrangements according to the principles described in the parent disclosure. These evaluations have led to certain further recognitions of preferred arrangements and principles relating to them. In this section, these evaluations and principles are addressed.

As explained with respect to FIGS. 1–10, in many applications filter elements according to the present invention will be cylindrical, with first and second opposite end caps. A slide member, ring member or support construction 40, FIG. 3, according to the present invention would be incorporated within each end cap, positioned as described. In general at least one of the end caps would include an annular sealing ring, such as ring 36, FIG. 10, thereon. In use an element is sealed against the tube sheet or structure 11, FIG. 5, with the seal ring 36 circumscribing a bore or air flow outlet (aperture) in the tube sheet. In FIG. 5 this is indicated by the positioning of the element 4a on yoke 12, with the individual posts of yoke 12 positioned around the clean air exit aperture in tube sheet 11.

In many conventional arrangements for industrial filtering, the tube sheet or surface against which the filter element is sealed in use, is oriented either vertically, or at a slight angle from vertical (as shown in FIG. 1). Thus, the various filter elements mounted in association with the tube sheet will be oriented either horizontally, or a slight downward angle from the horizontal (FIG. 1). In this context "horizontal" refers to the direction of extension of a longitudinal central axis of the filter element, when a substantially cylindrical element is involved. Herein the term "horizontal" will be used to describe mounting of elements on vertical tube sheets or tube sheets slightly inclined from vertical, such as in FIG. 1.

Figure 11:
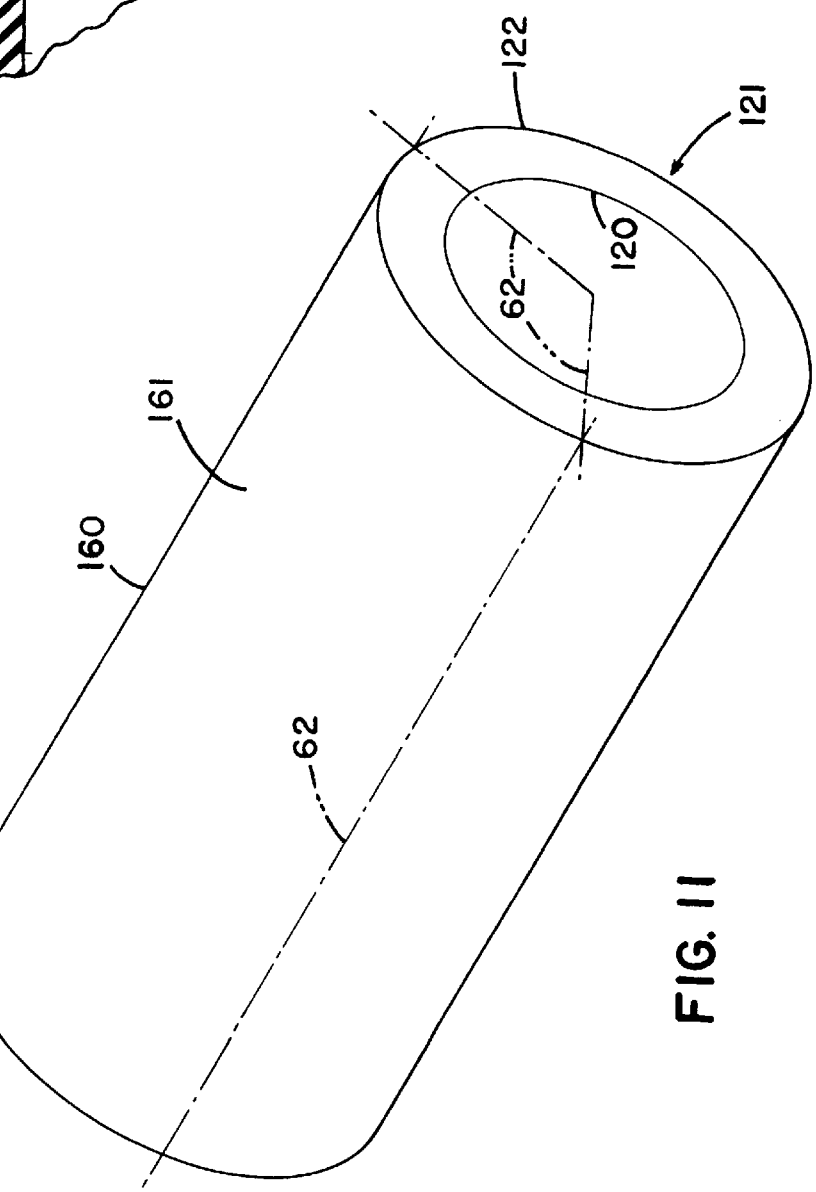
FIG. 11 is a schematic perspective view of a filter element according to the present invention with phantom lines indicating an upper 120° circumferential or peripheral area or region.

Also in such arrangements, the "dirty air" inlet is often positioned above the filter elements, i.e. in the top of the housing, for example as indicated in FIG. 1 at reference numeral 2. This means that in general there will be a biasing of the load on the cylindrical filter elements on an uppermost surface thereof, i.e. along a part of the outer surface of the elements which is directed toward inlet 2, in use. In general it has been found that the particulate distribution on the loaded filter element is found to occur with a greater loading on the one-third of the circumferential outer surface of the cylindrical filter element, which is oriented and directed most directly toward the top dirty air inlet. Thus, in typical use, the filter elements do not load evenly, but rather with the highest amount of loading in this region. In FIG. 11, a schematic depicting a cylindrical filter element 60 is shown. In the schematic, the region depicted by reference numeral 61, and defined by phantom lines 62, indicates the upper ⅓ or 120° radial section in which much of the loading would occur, in use.

Such an uneven load on the filter elements tends to create forces of stresses deforming the element from circular cross section. In addition, because the elements are horizontally or substantially horizontally mounted, the weight of the element, especially as it increases with loading, would tend to cause deformation from its original shape, even if the loading were relatively even.

If the element deforms substantially from its original shape, leakage at the seal between the element and the tube sheet can occur. A reason for this is that, as the element tends to deform from circular, a portion of the seal ring (illustrated in FIG. 10 at 36) may tend to roll and a leak can be developed. In addition, if the seal ring 36 circumscribes the air outlet in such a manner that there is relatively little distance between the portion of the tube sheet engaged by the seal ring and the opening in the tube sheet for the clean air exit, even a relatively small amount of deformation may be sufficient to overlap the seal ring with the air outlet aperture, with a concomitant failure of seal.

Figure 12:
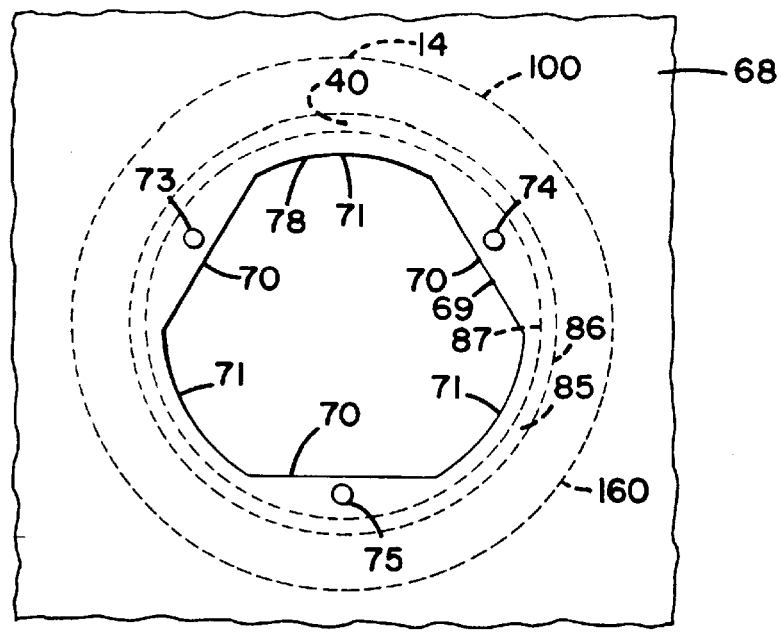
FIG. 12 is a fragmentary schematic view of a tube sheet including an air outlet aperture generally according to a TORIT® Downflo® industrial filter system, with phantom lines indicating positions of certain filter element features that would be associated therewith, in use.

With respect to this, attention is directed to FIG. 12. In FIG. 12 a sketch is provided showing the shape of a tube sheet aperture, in a conventional TORIT® Downflo® industrial filter housing, available from Donaldson Co., Minneapolis, Minn. 55440. The tube sheet is indicated at 68.

The aperture 69 is defined by straight sections 70 and curved sections 71. The guide rods or posts for the yoke support are indicated at 73, 74 and 75 respectively. In a conventional system, curved section 78 would be the uppermost section, with the tube sheet 68 being oriented either vertically or substantially vertically. Tube sheet 68 is a section of the wall indicated at 80 in FIG. 1.

Figure 13:
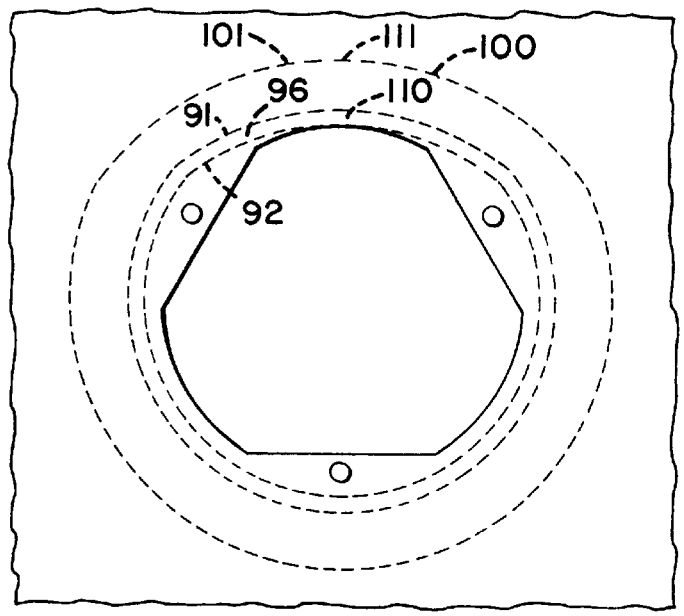
FIG. 13 is a view generally analogous to FIG. 12, with phantom lines indicating positions of components under distortion.

Referring again to FIG. 12, the circular region indicated at 85, i.e. between lines 86 and 87, indicates the circular curve of the seal ring 36 on the filter element, where it presses against the tube sheet 68, for a seal. The distance between curve 87 and the edge of the aperture 69, i.e. curve 78, is about 0.25–0.75 inches in a typical circumstance. Thus in some instances if the filter element deforms sufficiently so that the seal ring deforms from curve 85 downwardly by a distance of about 0.25–0.5 inches, a leak will develop. In FIG. 13, an example of such a deformation is shown schematically, with region 96 between lines 91 and 92 reflecting the location of the seal ring 36 after the deformation. In FIGS. 12 and 13, reference numeral 100 indicates the outer periphery of the filter element 60, i.e. the outer periphery 301 of the end cap 19, FIG. 3. It will be understood that outer periphery 100 can undergo an analogous distortion to the seal ring, as shown at region 101, FIG. 13.

In general, it has been found that when the filter element end caps comprise the preferred soft polyurethane material as described above, and when the filter element is at least about 1–3 feet long, at least about 10–15 inches in outer diameter and at least about 5–10 inches in inner diameter, and when the support construction or slide ring 40 (FIG. 4) is molded from polystyrene as described above (and the slide ring surface 43, FIG. 4, is about 0.25–0.5 inches wide and about 0.10–0.2 inches thick) if the filter element is mounted on a tube sheet as illustrated in the schematic of FIGS. 12 and 13, a leak may develop if the element is used until such time as its weight is increased substantially, for example 3–6 fold. Thus, when the particular materials identified in this paragraph are used, a lifetime of use of the filter element, before it needs to be changed, may be shorter than is most desirable. This does not mean that the filter element does not perform well, indeed it may perform very well. However, filter element lifetime may be shorter than is most desirable.

In addition, dust collection systems of the type in which filter elements according to the present invention are applied are often industrial manufacturing operations involving hazardous materials. Many such operations involve cleaning of equipment using lead shot which is "blasted" on the surface to be cleaned, and then which is pulled into the dust collection system to become loaded onto the filter elements. This spent shot is relatively heavy, and increases the weight of the filter element rather substantially, and in some instances over a relatively short period of time. This will, in general, exacerbate the problem.

Field tests with Donaldson Co. TORIT® Downflo® units (using elements about 26" long, 11–13 inches outer diameter, about 8.5–9.5 inches inner diameter) have suggested that the filter elements can accumulate contaminates such that the filter weight will increase from about 13 pounds (clean) to over 80 pounds (loaded), without the filter having achieved its end life. In typical such systems, the end life is often defined as use until flow is restricted such that the pressure drop across the tube sheet is 6–7 inches of water. Further, the field tests show that about 75% of the gained weight is distributed across the top one-third (120 radial degrees) of the filter, as described above with respect to FIG. 11.

For a commercial Donaldson TORIT® Downflo® dust collector, analysis showed that leaks could occur when the deflection of filter would exceed about 0.5 inches downward (FIG. 13) from its unloaded curve, given the location of the seal ring on the test elements and the size of the clean air aperture in such systems. This 0.5 inch deflection could be measured either by considering the distortion in the upper region 110 of seal ring 85, FIGS. 12 and 13; or, by considering the distortion in the upper region 111 of the filter element outer periphery 100, FIGS. 12 and 13; or, both.

As a result, it has been determined that the preferred design criteria for a filter element, especially one to be used in such a system, is such that the position of the seal ring (or the filter element outer periphery) does not deform more than about 0.5 inches (when a 50 pound load is applied along the longitudinal top one-third of the element) from its orientation with no load, when the arrangement is sealed against a tube sheet.

Figure 22:
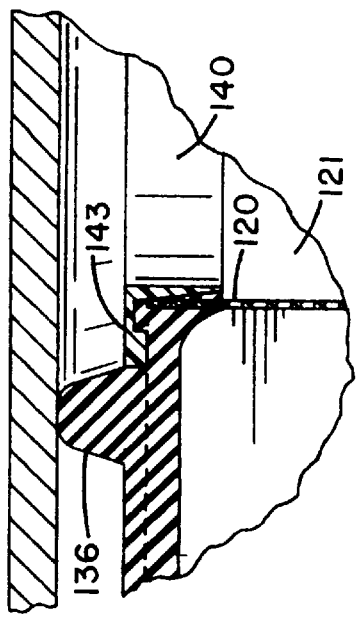

In some preferred relatively large arrangements, the seal ring 136 in certain preferred elements (FIG. 22) should be located about an additional 0.10–0.30 inches or so from its location (where depicted in FIG. 4) away from the inner bore 120 of the element 121, and toward its outer periphery 122. This is depicted in FIG. 22. In this context, reference to the distance of the seal ring from the inner bore 120 is meant to refer to distance from the base or edge of the seal ring where it engages the rest of the end cap, to the edge of the inner bore. In FIG. 4, the inner bore is indicated at 300 and the filter element outer periphery is indicated at 301. Referring to FIG. 22, in such preferred embodiments of larger arrangements, shoulder, ring or shelf 143 (or 43, FIG. 4) of the slide or support construction 140 is preferably expanded in size, until it extends adjacent to the sealing ring 136. By increasing the outer diameter of the sealing ring 136 in this manner, it is moved a slightly greater distance from the air exit aperture in a typical TORIT® Downflo® tube sheet, so the deformation which occurs during use, will be less likely to generate a leak.

It is preferred that the slide construction 140 not include a rigid component (shoulder or shelf 143) extending over more than about 25% of the width of the filter element, from the inner bore 121 to the outer periphery 122 (FIG. 11), so that it will not substantially resist crushing under the about 150 pound force as described. Preferably the width of shelf 143 in the support construction 140 is within the range of 0.2 to 0.7 inches; still more preferably 0.2–0.5 inches; and most preferably it is no greater than 0.4 to 0.45 inches.

It has also been found that to enhance resistance to the deformation in use, without impairing ability to be crushed under 150 pound weight or a 150 lb person standing or stamping on the element, it is preferred that a somewhat stronger material than polystyrene be used for the slide construction or support ring 40. Experiments with glass-filled nylon have indicated that it is a presently preferred material, although alternatives can be used. One material which has been found useable is 20% (by weight) glass filled nylon 6/6 available from Bay Resin Co. of Millington, Md. 21651, under catalog # PA11G20. Experiments with 40% glass filled nylon 6/6, from the same supplier, have also been successful. In general, when such materials are used to form the support ring 140, they can be molded under the conditions specified by the resin provider, without substantial variation. It is expected that in general at least 15% glass filled, and preferably 20–40% glass filled, polymers, especially nylon, will be preferred.

In-house test methods were developed in order to determine propensity for deformation. A test method used involved a Sintech computerized system, commercially available from Sintech Division of MTS Systems Corp., Stoughton, Mass. 02072. During the test, an element was slid over a tripod yoke assembly analogous to a TORIT® Downflo® assembly, where the three pods were located at the 2:00, 6:00 and 10:00 positions, as indicated in FIGS. 12 and 13. The test element was observed to actually rest on only the 2:00 and 10:00 positions as force was applied to the upper ⅓ of the element. This in general simulates forces encountered in a normal dust collector installation. During testing, force was applied at the top of the element, i.e. against location 61 in FIG. 11. Both the force and distance were automatically stored by the computer of the Sintech equipment.

When testing for the element crushing forces, the tripod assembly was removed and the whole filter was crushed up to 7.5 inches while the force levels were being recorded. The objective of these tests was to establish that the filter could be crushed without the force needed exceeding about 150–200 lbs, at a final deflection of 7.5 inches. The term "crushed up to 7.5 inches" is meant to indicate that it was crushed sufficiently so that the "Outside Diameter" or thickness was 7.5 inches less than before crushing.

The engineering data suggested that the best overall solution to improve the radial strength of the filter, for the TORIT® Downflo® system, resulted from a focus on the insert ring or slide construction 40 (or 140). Efforts were directed to production of an insert 40 that would withstand at least 50 pounds of longitudinal force along the top one-third of the filter without a deflection of the seal ring in that location (or alternately stated, the outer rim of the filter element at that location) more than 0.5 inches, when the test was conducted. The 20% glass-filled nylon 6/6 described above was found to meet this.

Further tests were conducted upon a commercial TORIT® Downflo® dust collector, Model DFT2-8, from Donaldson Co., Inc of Minneapolis, Minn. The weight was applied to the filter element in 10-pound increments, by loading weights on top of the filters. The deflection values were recorded. A design was considered preferred if the filter would hold up to 50 pounds of weight with a deflection of no more than 0.5 inches. In this context, the term "a deflection of no more than 0.5 inches", refers to a deflection of a portion of the outer rim (or the seal ring) of a substantially horizontally mounted filter element downwardly, at its uppermost point under the 50 pound load, from its location when no load is applied. Preferably there is no such deflection (i.e. no more than a 0.5 inch deflection) at up to about 80 pounds applied force, and most preferably no such deflection up to about 100 pounds of load. Of course, the arrangement should be such that it can still be readily crushed by a person weighing about 150–200 pounds.

Some Preferred Constructions

Donaldson Company, Inc., the Assignee of the resent invention, has developed preferred arrangements utilizing the principles described herein, for use in connection with its TORIT® Downflo®I and TORIT® Downflo®$^{II}$ industrial filter systems.

In both systems, the filter elements would preferably comprise the preferred inner liner, outer liner, filter material, and soft polyurethane end cap material described above and in U.S. Ser. No. 08/371,809. In the Downflo®I arrangement, a schematic of which is shown in the parent application at FIG. 1, the outer edge of seal ring 36 would be located about 0.3 inches from the inner bore of the filter element. The outside diameter of the filter element would be about 11 inches, and the inside diameter would be about 9.5 inches. The length of the filter element is about 26 inches. For such an arrangement, a preferred slide construction 40 or inner ring is illustrated in FIGS. 14–17. The preferred features and dimensions are as described in the next two paragraphs.

Referring to FIG. 14, construction 40 has an internal diameter of 8.43 inches and an outside diameter of about 9.0 inches. Referring to cross section FIG. 15, the width of shelf 200 is about 0.3 inches, with the thickness of the shelf, at 201, being about 0.125 inches. The size or depth of rim 202, which in use lines the inner bore of the end cap, is preferably about 0.5 inches.

Referring to FIG. 17, the thickness of section 210 is preferably about 0.06 inches, and section 211 is molded on about 0.06 inch radius.

Preferably the ring 40 of FIGS. 14–17 is molded from 20% glass filled nylon 6/6, as described above.

The filter element for a Downflo®II construction has an inside diameter about 1 inch larger, and is about the same length, as the filter element for Downflo®I. It has a larger outside diameter, typically about 14 inches. Preferably it is made from the same construction materials as those identified as preferred for the Downflo®I, but with about the same inside diameter. Thus, the shoulder ring or shelf of the component is about 0.12 inches wider for the Downflo®II than the Downflo®I, so it is a bit stronger. In FIGS. 18–21, a preferred slide construction 140 for the Downflo®II is depicted. The features and dimensions are as follows:

Referring to FIG. 18, the internal diameter is about 9.43 inches. The outside diameter is about 10.24 inches.

Referring to FIG. 19, shoulder or shelf 240 is about 0.42 inches wide. The thickness in region 241 is about 0.125 inches; and the depth of rim 242, which lines the inner bore of the end cap, is preferably about 0.5 inches.

Referring to FIG. 21, region 250 and structure 251 may be of the same thickness (and radius) as those associated with regions 210 and structure 211, FIG. 17.

In general, from the above preferred descriptions and materials defined, it will be apparent that in certain preferred arrangements according to the present invention, the following features are present:

(1) Both end caps comprise soft polyurethane material, or a similar material, which can be readily compressed.

(2) The arrangements should be constructed from materials such that they can be crushed under a person's weight of about 150 pounds or so, typically and preferably between a weight of 150–200 pounds applied against the filter element's longitudinal axis.

(3) Preferably no rigid construction, but rather only the soft (compressible) polyurethane foam, or a similar soft material, extends completely across the filter element end caps from the internal bore, to the outer periphery.

(4) Preferably the slide construction or inner ring (i.e. ring 40 or 140 of the FIGURES) is constructed of a material which provides sufficient resistance to the filter element from deformation, that when about 50 pounds is placed on a substantially horizontally mounted filter element, the upper surface of the filter element does not deform downwardly by more than about 0.5 inches, and preferably the deformation is not more than about 0.5 inches when about 80–100 pounds of force is applied.

(5) While the ring construction can comprise a wide variety of materials, a preferred material is a glass filled nylon, especially a 20%–40% glass filled nylon, as defined.

(6) The arrangements preferably include a sealing ring molded as part of one of the end caps, to function for axial sealing to a tube sheet or similar structure.

We claim:

1. A filter element comprising:
   (a) first and second end caps;
      (i) said first end cap consisting essentially of foamed polyurethane having an as molded density of about 14–22 pounds per cubic foot;
      (ii) said first end cap having a first outer surface and an outer periphery;
   (b) a cylindrical extension of filter media enclosed between said first and second end caps;
      (i) said media comprising pleated paper media;
      (ii) said first end cap and said filter media defining a central aperture; said central aperture having a diameter of at least 5 inches;
   (c) an outer liner extending between said first and second end caps;
   (e) an inner liner extending between said first and second end caps;
      (i) said inner and outer liners being an expanded metal screen;
   (f) an annular sealing ring;
      (i) said sealing ring extending outwardly from said first outer surface of said first end cap;
      (ii) said sealing ring positioned about 0.2–0.7 inch from said central aperture;
      (iii) said sealing ring being an integrally molded part of said first end cap;
      (iv) said sealing ring consisting essentially of foamed polyurethane having an as molded density of about 14–22 pounds per cubic foot;
      (v) said sealing ring having an axially directed top edge, first and second sidewall portions, and a base;
         (A) said first sidewall portion being immediately adjacent to and angled from said sealing ring top edge;
         (B) said second sidewall portion being immediately adjacent to and angled from said sealing ring top edge;
         (C) said top edge, first sidewall portion, and second sidewall portion defining a portion of said sealing ring which has diverging sidewalls in extension from said top edge;
         (D) said base having a cross-section width greater than a cross-section of the top edge of the sealing ring;
            (i) said base having a width of at least 0.5 inches, when viewed as a cross-section;
      (v) said first outer surface of said first end cap being a continuous, planar surface in complete extension from said outer periphery of said first end cap to said first sidewall portion.

2. A filter element according to claim 1 wherein:
   (a) said first end cap, including said sealing ring, has a hardness within the range of about 10 to 40, Shore A.

3. A filter element according to claim 2 wherein:
   (a) said top edge, first sidewall portion, and second sidewall portion of said sealing ring form a triangular shape with a truncated portion; said truncated portion comprising said top edge.

4. A filter element according to claim 3 wherein:
   (a) said first and second sidewall portions each extend from said top edge at a same angle.

5. A filter element according to claim 2 wherein:
   (a) said sealing ring has a height from said base to said top edge of about 0.50 inches.

6. A filter element according to claim 2 wherein:
   (a) said sealing ring has a rounded top.

7. A filter element according to claim 2 wherein:
   (a) said element has an outside diameter of at least 10 inches.

8. A filter element according to claim 2 wherein:

(a) said element has a length of at least 10 inches.

9. A filter element according to claim 2 having:

(a) an outside diameter of 10–15 inches;
(b) an inside diameter of 5–10 inches; and,
(c) a length of at least 10 inches.

10. A filter element according to claim 2 wherein:

(a) said sealing ring includes a height which is compressible by about 50%, when compressed during an air filtering operation.

11. A filter element according to claim 2 wherein:

(a) said second end cap comprises soft, compressible, polymeric material.

12. A filter element according to claim 2 wherein:

(a) said second end cap has an air flow aperture therein.

13. A filter element according to claim 1 wherein:

(a) said sealing ring has a height to width ratio of at least 1:1.

* * * * *